(No Model.)
G. A. J. TELGE.
ELECTRIC METER.
No. 555,589. Patented Mar. 3, 1896.
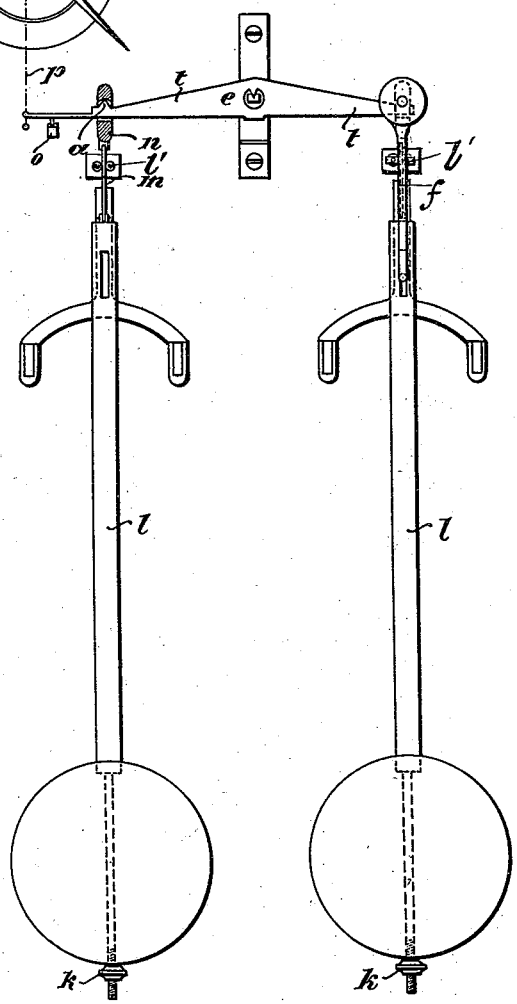
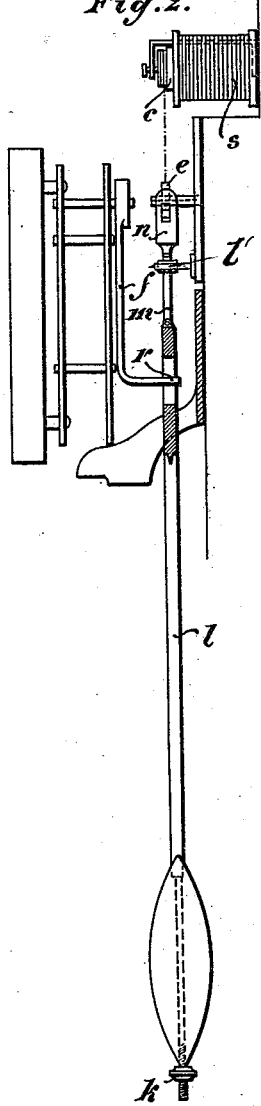
Witnesses:
Jas. W. White
Herbert Bradley
Inventor
G. A. J. Telge,
By Knight Bros
Attys.

UNITED STATES PATENT OFFICE.

GEORG AUGUST JULIUS TELGE, OF OLDENBURG, GERMANY.

ELECTRIC METER.

SPECIFICATION forming part of Letters Patent No. 555,589, dated March 3, 1896.

Application filed February 21, 1895. Serial No. 539,295. (No model.)

*To all whom it may concern:*

Be it known that I, GEORG AUGUST JULIUS TELGE, engineer, residing at 5ª Sophienstrasse, Oldenburg, Grand Duchy of Oldenburg, in the Empire of Germany, have invented Improvements in Electricity-Meters, of which the following is a specification, reference being had therein to the accompanying drawings.

The present invention relates to an electricity-meter, in which the pendulum, or it may be the balance-spring, of a clock-movement is caused, by means of a pivoted or rocking beam under the influence of a solenoid core, to undergo variations in length or position, or it may be variations in tension, so that the difference between the times indicated by the clocks will give a direct measure of the quantity of electricity that has passed through the solenoid.

The subject of this invention is illustrated in the accompanying drawings, in which—

Figure 1 is a front elevation, and Fig. 2 is a side elevation, of the apparatus.

A pivoted beam $e$ has suspended from the knife edges $a$ on each end $t$ of said beam, the pendulum of two clock-movements, which are arranged as follows: Each pendulum-rod $l$ carries at its lower end a pendulum-weight which is capable of being adjusted by means of the screw-nut $k$. At its other end each rod $l$ is connected by means of a suitable flexible medium, such as wide weak spring $m$, which passes through fixed bifurcated stop $l'$ to the suspension device $n$. The escapement-arm or anchor $f$ of the clock-movement engages, by means of a projecting part $r$, in a slot in the rod $l$, which is arranged to be slightly adjustable with respect to this projecting part in the slot. To the extension of one arm of the pivoted or rocking beam there is fixed a cord $p$, which passes around a pulley $c$ that is fixed on the axle of the pointer of an ampère-meter. The said extension of the lever-arm is also provided with a damping or moderating or regulating device $o$ for the purpose of preventing sudden and jerky motion of the rocking beam. Each end of the rocking beam $e$ thus carries a pendulum arrangement of similar construction.

The apparatus operates in the following manner: So long as no current is passing through the solenoid of the ampère-meter, the rocking beam maintains its horizontal position of equilibrium and both pendulums have exactly the same period or duration of oscillation; but when current is flowing through the solenoid of the ampère-meter, the pulley $c$ will rotate with the pointer of the instrument and thereby wind up the cord $p$ to a greater or less extent in proportion to the strength of the current and to the angle of rotation produced thereby. By this means the rocking beam $e$ is moved from its horizontal position of equilibrium, and it draws the pendulum up through the stop $l'$ and relatively to the projecting part $r$ of the anchor. By this means the active or operative length of the pendulum is shortened. Consequently the duration or period of each oscillation of the pendulum is reduced, while the relation between escapement-arm $f$ and center of vibration $l'$ remains constant. During this operation the depression of the other arm, $t$, of the rocking beam, has caused, in an analogous manner, the second pendulum (of the other clock-movement) to become longer and consequently to acquire a longer period of oscillation—that is to say, to oscillate more slowly. The difference between the times indicated by the clocks will then give a measure of the quantity of electricity that has flowed through the solenoid. In place of the said second pendulum and clock-movement a simple balance-weight may be employed having merely the friction of counterbalancing the one pendulum, and thus reducing to a minimum the power required to be exerted on the axle of the ampère-meter in order to raise the measuring-pendulum.

Instead of the pendulum movement other clock-movements may also be employed in the construction of this apparatus with very slight constructional modifications.

It should be clearly understood that this apparatus, which is gaged or calibrated in the usual manner, does not necessarily require the use of an ampère-meter, but that any apparatus may be employed in place thereof which depends as regards its extent of movement on the strength or quantity of current flowing through it.

What I claim, and desire to secure by Letters Patent of the United States, is—

1. An electricity-meter comprising a pair of normally synchronous indicators, and a device under control of the current to be measured, having oppositely-working regulating connections with the indicating mechanisms for adjusting them simultaneously in opposite directions and thus differentiating their readings proportionately to the controlling-current, as explained.

2. An electricity-meter comprising a pair of indicators, regulators controlling the respective indicators, a fulcrumed lever having connection at its respective ends with the regulators for varying the periods of their vibrations, and a device under control of the current to be measured, having connection with said lever, and rocking it to differentiate the regulators, as explained.

3. In an electricity-meter, the combination of an electromagnetic device under control of the current to be measured, a centrally-fulcrumed lever with which said device is connected, a pair of pendulums supported on the respective ends of the lever, a pair of normally synchronous clocks under control of the respective pendulums and fixed stops through which the pendulums are moved by the rocking of the lever, to change their lengths beyond the centers of vibration formed by said stops, as and for the purpose set forth.

GEORG AUGUST JULIUS TELGE.

Witnesses:
FRANZ HERMANN HOYER,
WILH. KRÄMER.